United States Patent
Eckleder et al.

(10) Patent No.: US 8,301,906 B2
(45) Date of Patent: Oct. 30, 2012

(54) APPARATUS FOR WRITING INFORMATION ON A DATA CONTENT ON A STORAGE MEDIUM

(75) Inventors: Andreas Eckleder, Malsch (DE); Richard Lesser, Karlsruhe (DE); Reiner Kopf, Straubenhardt (DE)

(73) Assignee: Nero AG, Karlsbad (DE)

( * ) Notice: Subject to any disclaimer, the term of this patent is extended or adjusted under 35 U.S.C. 154(b) by 1262 days.

(21) Appl. No.: 11/829,439

(22) Filed: Jul. 27, 2007

(65) Prior Publication Data

US 2008/0256365 A1    Oct. 16, 2008

Related U.S. Application Data

(63) Continuation of application No. PCT/EP2007/003658, filed on Apr. 25, 2007.

(60) Provisional application No. 60/746,964, filed on May 10, 2006, provisional application No. 60/747,363, filed on May 16, 2006.

(30) Foreign Application Priority Data

Apr. 13, 2007 (EP) .................... 07007621

(51) Int. Cl.
- *G06F 21/00* (2006.01)
- *H04L 29/06* (2006.01)
- *H04L 9/32* (2006.01)
- *G06F 11/30* (2006.01)
- *G06F 12/14* (2006.01)

(52) U.S. Cl. ......... 713/189; 713/154; 713/175; 713/190

(58) Field of Classification Search .......... None
See application file for complete search history.

(56) References Cited

U.S. PATENT DOCUMENTS

| | | | |
|---|---|---|---|
| 5,544,083 A | 8/1996 | Iizuka et al. | |
| 5,596,639 A | 1/1997 | Kikinis | |
| 5,796,824 A | 8/1998 | Hasebe et al. | |
| 5,940,505 A * | 8/1999 | Kanamaru | 705/58 |
| 6,188,659 B1 | 2/2001 | Mueller et al. | |
| 6,243,796 B1 | 6/2001 | Otsuka | |
| 6,578,164 B1 * | 6/2003 | Stokes et al. | 714/719 |
| 6,694,023 B1 | 2/2004 | Kim | |
| 6,978,376 B2 | 12/2005 | Giroux et al. | |

(Continued)

FOREIGN PATENT DOCUMENTS

AU    199960936 B2    8/2003

(Continued)

OTHER PUBLICATIONS

Gnorlich, Carsten, "Dvdisaster Version 0.66," Mar. 25, 2006, XP-002439815.

(Continued)

*Primary Examiner* — Shin-Hon Chen
(74) *Attorney, Agent, or Firm* — Michael A. Glenn; Glenn Patent Group

(57) ABSTRACT

An apparatus for writing checksum information on a data content on a storage medium. The apparatus has a provider for providing checksum information based on the data content and a writer for writing the data content and the checksum information on the storage medium such that a baseline reader and an enhanced reader can read the data content, the enhanced reader can read and process the checksum information, and the baseline reader ignores, skips or does not read the checksum information.

10 Claims, 13 Drawing Sheets

U.S. PATENT DOCUMENTS

| | | | |
|---|---|---|---|
| 7,057,993 B2 | 6/2006 | Barnard et al. | |
| 7,080,041 B2 | 7/2006 | Nagel | |
| 7,095,694 B2 | 8/2006 | Sako et al. | |
| 7,117,422 B2* | 10/2006 | Duncan et al. | 714/766 |
| 7,194,636 B2 | 3/2007 | Harrison | |
| 7,203,140 B2 | 4/2007 | Haga | |
| 7,213,005 B2 | 5/2007 | Mourad et | |
| 7,260,219 B2 | 8/2007 | Linnartz et al. | |
| 7,379,549 B2 | 5/2008 | Pelly et al. | |
| 7,526,657 B2 | 4/2009 | Saneto et al. | |
| 2001/0018729 A1 | 8/2001 | Johnson | |
| 2001/0049662 A1 | 12/2001 | Linnartz et al. | |
| 2002/0023219 A1* | 2/2002 | Treffers et al. | 713/176 |
| 2002/0080416 A1* | 6/2002 | Quine | 358/405 |
| 2002/0154779 A1 | 10/2002 | Asano et al. | |
| 2003/0007437 A1* | 1/2003 | Staring | 369/53.21 |
| 2003/0028809 A1* | 2/2003 | Goodman et al. | 713/201 |
| 2003/0046563 A1* | 3/2003 | Ma et al. | 713/190 |
| 2003/0046592 A1 | 3/2003 | Woodruff | |
| 2003/0101330 A1* | 5/2003 | Duesterwald et al. | 712/32 |
| 2004/0081047 A1 | 4/2004 | Baik | |
| 2004/0193871 A1* | 9/2004 | Seshadri | 713/154 |
| 2005/0044045 A1 | 2/2005 | Pelly et al. | |
| 2005/0086567 A1 | 4/2005 | Cronch | |
| 2005/0152251 A1 | 7/2005 | Harumatsu | |
| 2005/0180573 A1 | 8/2005 | Pelly et al. | |
| 2005/0246392 A1* | 11/2005 | Ishizaka | 707/200 |
| 2006/0041529 A1 | 2/2006 | Nakayama | |
| 2006/0062073 A1* | 3/2006 | Kitani et al. | 365/232 |
| 2006/0177066 A1 | 8/2006 | Han et al. | |
| 2007/0253676 A1 | 11/2007 | Roh | |
| 2007/0288713 A1 | 12/2007 | Sugimoto et al. | |
| 2008/0114981 A1* | 5/2008 | Hars | 713/170 |
| 2008/0276092 A1* | 11/2008 | Eberhardt et al. | 713/175 |

FOREIGN PATENT DOCUMENTS

| | | |
|---|---|---|
| EP | 0785547 A2 | 7/1997 |
| EP | 0802527 A1 | 10/1997 |
| EP | 0984346 A | 3/2000 |
| EP | 1164588 A2 | 12/2001 |
| EP | 1184774 A | 3/2002 |
| EP | 1587095 A2 | 10/2005 |
| EP | 1622145 A2 | 2/2006 |
| GB | 2375651 A | 11/2002 |
| JP | 2003/006996 A | 1/2003 |
| WO | WO 99/55055 | 10/1999 |

OTHER PUBLICATIONS

Clemens, Peter B., "QuickPar 0.9.1," Jul. 4, 2004, XP002439816.

Zander, H., "CD-Recording AM PC," Mar. 3, 1997, FKT Fernseh Und Kinotechnick, Fachverlag Schiele & Schon GMBH, Berlin, DE, vol. 51, No. 3, pp. 132-141.

Int'l, Search Report and Written Opinion mailed Oct. 10, 2007 in related PCT application No. PCT/EP2007/003656, 15 pages.

Int'l Preliminary Report on Patentability mailed on Aug. 25, 2008 in related PCT application No. PCT/EP2007/003654, 14 pages.

Int'l Preliminary Report on Patentability mailed on Aug. 25, 2008 in related PCT application No. PCT/EP2007/003655, 9 pages.

* cited by examiner

FIG 4

| Byte \ Bit | 7 | 6 | 5 | 4 | 3 | 2 | 1 | 0 |
|---|---|---|---|---|---|---|---|---|
| 0 ... 3 | Structure Size ||||||||
| 4 ... 7 | Structure Identifier `BTAS` ||||||||
| 8 ... 15 | DSI LSN ||||||||
| 16 ... 23 | FFIT LSN ||||||||
| 24 ... 31 | ARB LSN ||||||||
| 32 ... 39 | Backup DSI LSN ||||||||
| 40 ... 47 | Backup FFIT LSN ||||||||
| 48 ... 55 | Backup ARB LSN ||||||||

FIG 5

| Byte \ Bit | 7 | 6 | 5 | 4 | 3 | 2 | 1 | 0 |
|---|---|---|---|---|---|---|---|---|
| 0 ... 3 | FFITH Size (FFITHS) ||||||||
| 4 ... 7 | colspan: FFIT Identifier `BFIT` ||||||||
| 8 ... 15 | SecurDisc FFIT Version Number (High, Low) ||||||||
| 16 ... 23 | SecurDisc Copy Protection Recovery field ||||||||
| 24 ... 31 | SecurDisc Pass phrase Verification Checksum (EPVC) ||||||||
| 32 ... 39 | SecurDisc Global Feature Flag Mask ||||||||
| 40 ... 47 | FFITE Chunk Size (FFITECS) ||||||||
| 48 ... 55 | Number of FFITE Chunks (NUMFFITE) ||||||||

FIG 6

| Bit<br>Byte | 7 | 6 | 5 | 4 | 3 | 2 | 1 | 0 |
|---|---|---|---|---|---|---|---|---|
| 0<br>:<br>7 | colspan="8" | LSN of File Fragment |||||||
| 8<br>:<br>15 | colspan="8" | Size of File Fragment in logical sectors |||||||
| 8 | | | | | CS | PP | colspan="2" | CP |
| 9 | colspan="8" | Reserved (SecurDisc Feature Flag Mask) |||||||
| 10<br>:<br>25 | colspan="8" | File Fragment Checksum |||||||

FIG 7

| CP Value | Description |
|---|---|
| 00b | Copy Protection is not used for this file fragment. |
| 01b | Standard Copy Protection is used for this file fragment. |
| 10b | Copy Protection is used for this file fragment. Special protected output rules apply as specified in the compliance rules for viewer applications. |
| 11b | Reserved |

FIG 8

| Byte \ Bit | 7 | 6 | 5 | 4 | 3 | 2 | 1 | 0 |
|---|---|---|---|---|---|---|---|---|
| 0 : 3 | \multicolumn{8}{c}{DSI Size (DSIS)} |||||||| 
| 4 : 7 | DSI Identifier 'BDSI' |||||||| 
| 8 : 9 | SecurDisc DSI Version Number (High, Low) |||||||| 
| 10 : 25 | Disc Signature RSA Public Key Hash |||||||| 
| 26 : 27 | Number of Redundancy Maps (N) |||||||| 
| 28 : 31 | Reserved |||||||| 
| 32 : 287 | RSA Disc Signature |||||||| 
| 288 : 287+((N+19*28) | Redundancy Information for N+1 Redundancy Maps ||||||||

FIG 9

| Byte \ Bit | 7 | 6 | 5 | 4 | 3 | 2 | 1 | 0 |
|---|---|---|---|---|---|---|---|---|
| 0 : 3 | Redundancy Level (REDLEVEL) ||||||||
| 4 | Map Type ||| Reserved |||||
| 5 | Redundancy Function ||||||||
| 6 7 | Reserved ||||||||
| 8 : 11 | Number of Redundancy Map Entries (NUMRMAPE) ||||||||
| 12 : 19 | Redundancy Map LSN ||||||||
| 20 : 27 | Backup Redundancy Map LSN ||||||||

FIG 10

| Bit<br>Byte | 7 | 6 | 5 | 4 | 3 | 2 | 1 | 0 |
|---|---|---|---|---|---|---|---|---|
| 0<br>:<br>3 | colspan="8" UNIQUE PACKET number |||||||||
| 4<br>:<br>7 | colspan="8" PACKET Number of MAPPED PACKET #1 |||||||||
| 8<br>:<br>7+ (REDLEVEL-2)*4 | colspan="8" PACKET numbers of MAPPED PACKETS #2 through #REDLEVEL-1 |||||||||
| 8+ (REDLEVEL-2)*4<br>11+ (REDLEVEL-2)*4 | colspan="8" PACKET Number of MAPPED PACKET #REDLEVEL |||||||||

FIG 11

| Bit<br>Byte | 7 | 6 | 5 | 4 | 3 | 2 | 1 | 0 |
|---|---|---|---|---|---|---|---|---|
| 0<br>:<br>3 | \multicolumn{8}{c|}{ARB Length (N)} ||||||||
| 4<br>:<br>N+3 | \multicolumn{8}{c|}{Application Revocation Block} ||||||||

FIG 12

| Bit<br>Byte | 7 | 6 | 5 | 4 | 3 | 2 | 1 | 0 |
|---|---|---|---|---|---|---|---|---|
| 0 | | | | Feature Code | | | | |
| 1 | | | | | | | | |
| 2 | Reserved | | | Version | | | Persistent | Current |
| 3 | | | | Additional Length | | | | |
| 4 | | | | Reserved | | | | CPA |
| :<br>7 | | | | | | | | |

APPARATUS FOR WRITING INFORMATION ON A DATA CONTENT ON A STORAGE MEDIUM

CROSS-REFERENCE TO RELATED APPLICATIONS

This application is a continuation of copending International Application No. PCT/EP2007/003658, filed Apr. 25, 2007, which designated the United States, and claims priority to U.S. Provisional Patent Application No. 60/746,964 filed May 10, 2006, U.S. Provisional Patent Application No. 60/747,363, filed May 16, 2006, and European Patent Application No. 07007621.1, filed Apr. 13, 2007.

TECHNICAL FIELD

The present invention is in the field of data security and content verification.

BACKGROUND

In many applications, especially when it comes to confidential data, it is essential to be able to verify and secure a data content. Data integrity becomes more and more important, also in the sector of private applications and data. Conventional data administration concepts lack the possibility for users to allow other users to verify or integrity check data. Especially when using storage media that season and tend to become more and more erroneous with time it is a problem that at some point one can no longer be sure of the data validity or consistency, i.e. if the data can still be retrieved correctly from such a medium.

Moreover conventional storage concepts and storage media do not allow to verify an origin of data. For example if data is transferred using portable storage media, e.g. by sending a CD (CD=Compact Disc) or a DVD (DVD=Digital Versatile Disk) by mail, the receiver can not easily prove the origin of the data, i.e. verify the integrity of the data.

According to an embodiment, an apparatus for writing checksum information on a data content on a storage medium may have: a provider for providing checksum information based on a data content; and a writer for writing the data content and the checksum information on the storage medium, such that a baseline reader and an enhanced reader can read the data content, the enhanced reader can read and process the checksum information and the baseline reader ignores, skips or does not read the checksum information.

According to another embodiment, a method for writing checksum information on a data content on a storage medium may have the steps of: providing checksum information based on a data content; and writing the data content and the checksum information on the storage medium such that a baseline reader and an enhanced reader can read the data content, the enhanced reader can read and process the checksum information, and the baseline reader ignores, skips or does not read the checksum information.

According to another embodiment, a computer program may have a program code for performing, when the computer program runs on a computer, a method for writing checksum information on a data content on a storage medium, wherein the method may have the steps of: providing checksum information based on a data content; and writing the data content and the checksum information on the storage medium such that a baseline reader and an enhanced reader can read the data content, the enhanced reader can read and process the checksum information, and the baseline reader ignores, skips or does not read the checksum information.

According to another embodiment, an apparatus for verifying a data content from a storage medium may have: a reader for reading the data content and the first checksum information from the storage medium; a provider for providing a second checksum information based on the data content; and a provider for providing a verification indication if the first and the second checksum information are equal.

According to another embodiment, a method for verifying a data content from a storage medium may have the steps of: reading the data content and the first checksum information from the storage medium; providing a second checksum information based on the data content; and providing verification indication if the first and the second checksum information are equal.

According to another embodiment, a computer program may have a program code for performing, when the program code runs on a computer, a method for verifying a data content from a storage medium, wherein the method may have the steps of: reading the data content and the first checksum information from the storage medium; providing a second checksum information based on the data content; and providing verification indication if the first and the second checksum information are equal.

According to another embodiment, an optical disc may have a data section having data information, a checksum section having information on checksum data or encrypted checksum data based on the data information and a control section having information on the association of the data information and the information on checksum data or encrypted checksum data.

The present invention is based on the finding that based on checksums, respectively encrypted checksums, data validity and integrity can be verified. In one embodiment, this is accomplished by storing a checksum over each file that is recorded on an optical disc in a file system independent way.

Embodiments of the present invention therefore provide the advantage that data can be verified, and a user can be pre-vented from working with broken data. Moreover, an effective mechanism is enabled to verify an origin of data stored on a storage medium. Some embodiments support public key signatures for optical storage media. Using this technology, the authenticity of a disc can be proven by verifying a digital signature stored on the disc against a public verification key that needs to be provided once by an author of optical media. The digital signature refers to a checksum of the data on the storage medium. Some embodiments can use the private counterpart to the verification key to digitally design a hash value generated over the checksums.

Embodiments may allow users to verify that data stored on a disc has not decayed in any way and is still in its original state by creating checksums over all files stored on the disc. In a similar way embodiments may store checksums or encrypted checksums on any other storage media as memory cards, hard discs, magneto-optic memory devices, ROM (ROM=Read Only Memory) etc.

In one embodiment, checksum generation can be done on-the-fly and checksums can be stored at the end of, for example, an optical disc. The allocations can be referenced through a pointer stored in a certain sector, in one embodiment sector 15 of the user data area could be used.

Assignment of a particular checksum to its respective file can be done through a chunk table in an embodiment specifying a logical sector number of a first data block of a file and a checksum the file is associated with.

Algorithms used for building the checksums can be chosen from a number of different options, including but not restricted to conventional algorithms as, for example, SHA-1 (SHA=Secure Hash Algorithm), SHA-256, MD5 (MD=Message Digest Algorithm) or custom AES-128 (AES=Advanced Encryption Standard).

File checksum calculation can be performed by host software as part of a file system authoring process in one embodiment. Protection flags may specify for each file whether a sector payload encryption has been applied to that file and whether the host software needs to decrypt sector content before being able to use it.

The chunk size can be the size of a single entry of the chunk table, the size may be fixed for a particular embodiment and serves as an extensibility feature with backwards compatibility for future extensions of embodiments.

BRIEF DESCRIPTION OF THE DRAWINGS

Embodiments of the present invention will be detailed subsequently referring to the appended drawings, in which:

FIG. 4 shows an embodiment of an anchor structure;

FIG. 5 shows an embodiment of a file fragment information table structure;

FIG. 6 shows an embodiment of a file fragment information table entry;

FIG. 7 shows an embodiment of a definition of a copy protection field;

FIG. 8 shows an embodiment of a disc security information structure;

FIG. 9 shows an embodiment of a redundancy information field structure;

FIG. 10 shows an embodiment of a redundancy map information structure;

FIG. 11 shows an embodiment of an application revocation block structure; and

FIG. 12 shows an embodiment of a secure disc feature descriptor and feature control structure.

DETAILED DESCRIPTION

Figure 1A:
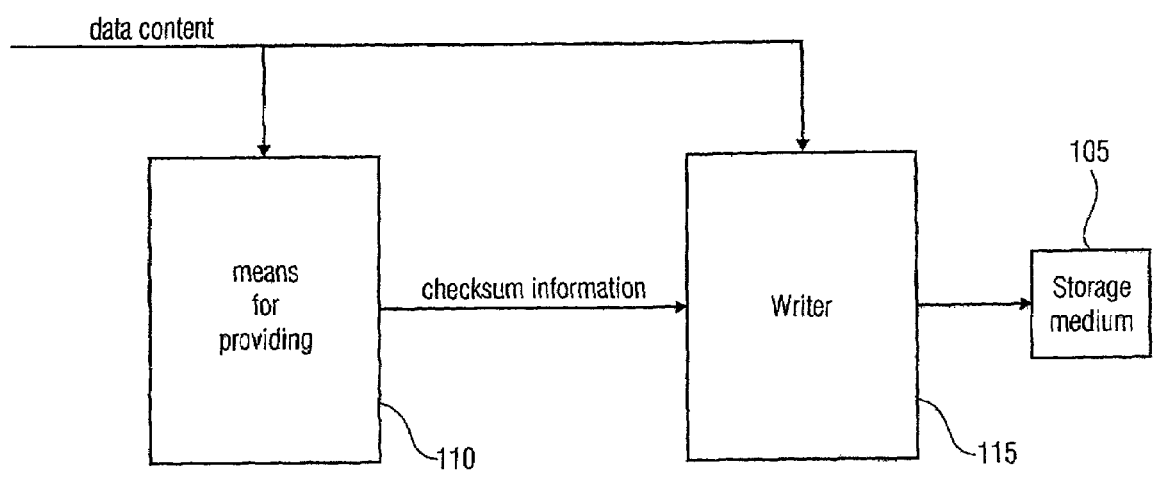
FIG. 1a shows an embodiment of an apparatus for writing.

FIG. 1a shows an embodiment of an apparatus 100 for writing checksum information on a data content on a storage medium 105. The apparatus 100 comprises a means 110 for providing checksum information based on the data content. Furthermore, the apparatus 100 comprises a writer 115 for writing the data content and the checksum information on the storage medium 105 such that a baseline reader and an enhanced reader can read the data content, the enhanced reader can read and process the checksum information, and the baseline reader ignores, skips or does not read the checksum information.

Figure 1B:
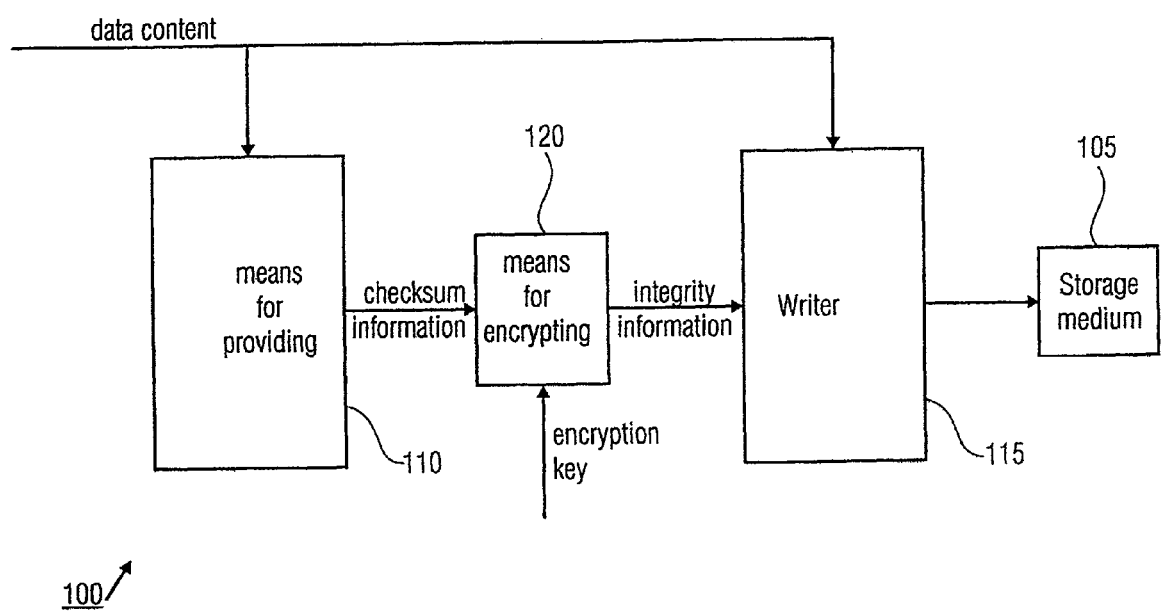
FIG. 1b shows another embodiment of an apparatus for writing.

FIG. 1b shows another embodiment of an apparatus 100 for writing information on data content on a storage medium 105. The apparatus 100 shown in FIG. 1b further comprises a means 120 for encrypting the checksum information to obtain an integrity information, the encryption being based on an encryption key and the writer 115 is adapted for writing the integrity information to the storage medium 105.

In another embodiment, the writer 115 is adapted for using an optical disc as a storage medium 105. Moreover, the writer 115 can be adapted for writing control information on a physical or logical location of the checksum information or integrity information on the storage medium 105. Furthermore, the writer 115 can be adapted for writing the checksum information or the integrity information to the logical end of the storage medium 105.

In yet another embodiment, the writer 115 may be adapted for writing a chunk table specifying an association between data and checksums or integrity information. The writer 115 may further be adapted for writing a 128-bit checksum for a data segment to the storage medium 105.

In embodiments, the means 120 for encrypting the checksum information may utilize asymmetrical or symmetrical encryption algorithms. For example, a private key of a user may be used to encrypt the checksum and to obtain the integrity information so that using a public key of that user serves for verifying the checksums and, thus, the data content.

Figure 2A:
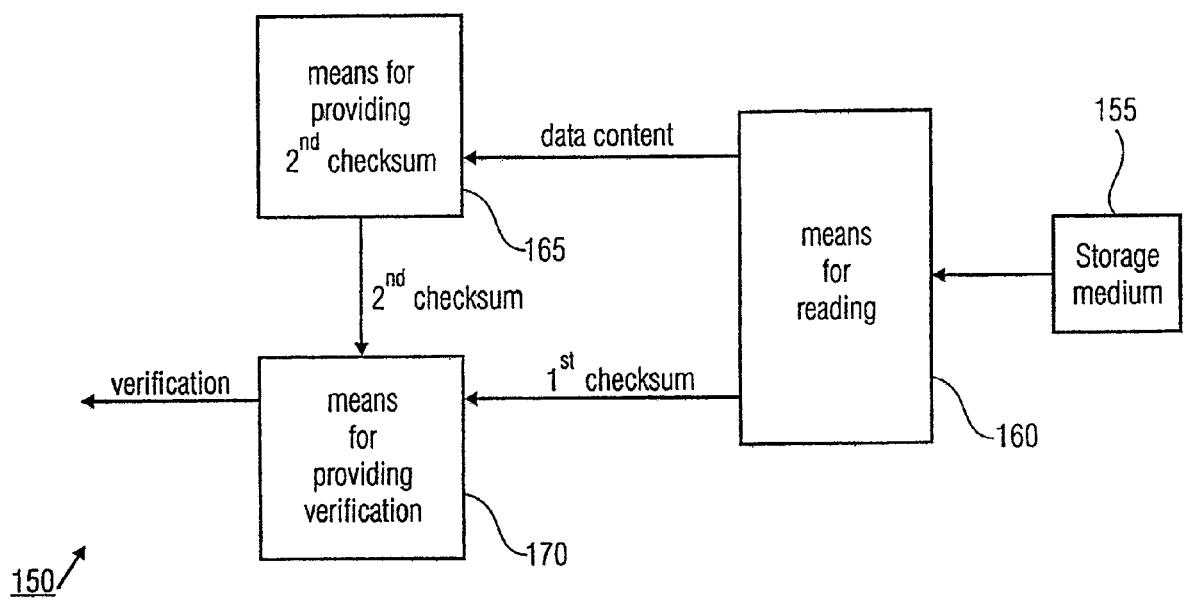
FIG. 2a shows an embodiment of an apparatus for verifying.

FIG. 2a shows an apparatus 150 for verifying a data content from a storage medium 155. The apparatus 150 comprises a means 160 for reading the data content and a first checksum information from the storage medium 155. The apparatus 150 further comprises a means 165 for providing a second checksum information based on the data content and the means 170 for providing a verification indication if the first and the second checksum information are equal.

Figure 2B:
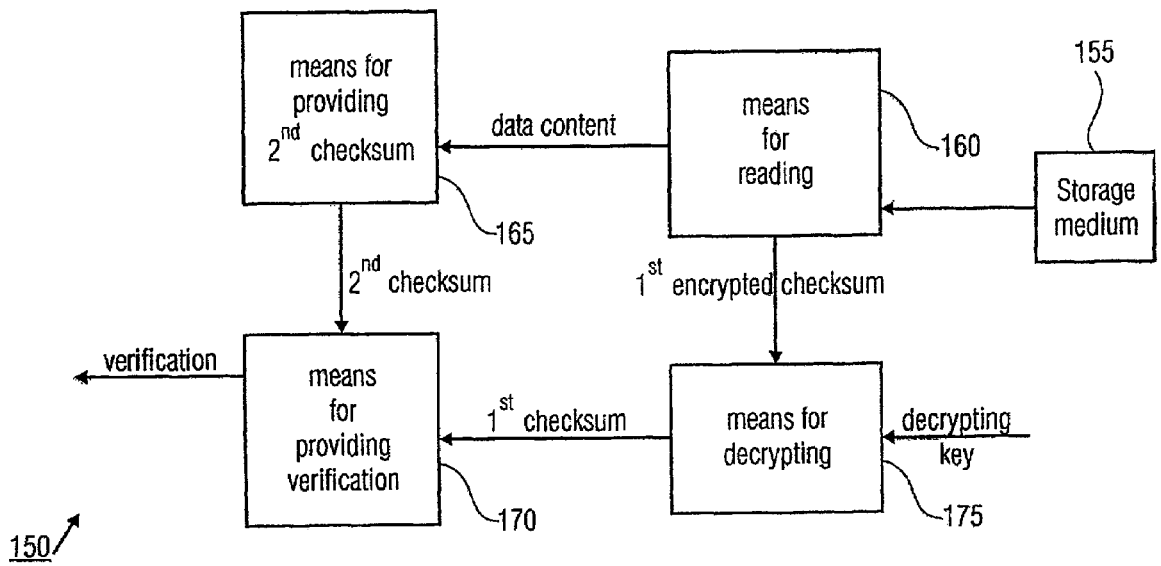
FIG. 2b shows another embodiment of an apparatus for verifying.

FIG. 2b shows another embodiment of an apparatus 150 for verifying a data content from a storage medium 155. The embodiment shown in FIG. 2b comprises similar components as the apparatus 150 shown in FIG. 2a, with the means 160 for reading being adapted for reading a first encrypted checksum information and further comprising a means 175 for decrypting the first encrypted checksum information to obtain the first checksum information. Embodiments, therefore, read and decrypt encrypted checksum information, which may serve as integrity information e.g. in case of usage of a private and public key encryption. With these embodiments, a user can use a private key to encrypt the checksums, another user can verify the checksums by decrypting them with a public key to obtain the decrypted checksum information, which can be verified against checksum information obtained from the data content.

In embodiments, the means 160 for reading can be adapted for reading from optical discs. Moreover, the means 160 for reading can be adapted for reading control information from the storage medium 155, the control information may comprise information of a physical or logical location of the first checksum information or the first encrypted checksum information.

In another embodiment, the means 160 for reading can be adapted for reading a chunk table having information on an association between data and first checksum information or first encrypted checksum information from the storage medium 155. In one embodiment, the means 160 for reading can be adapted for reading a first 128-bit checksum or encrypted checksum information from the storage medium 155.

Figure 3:
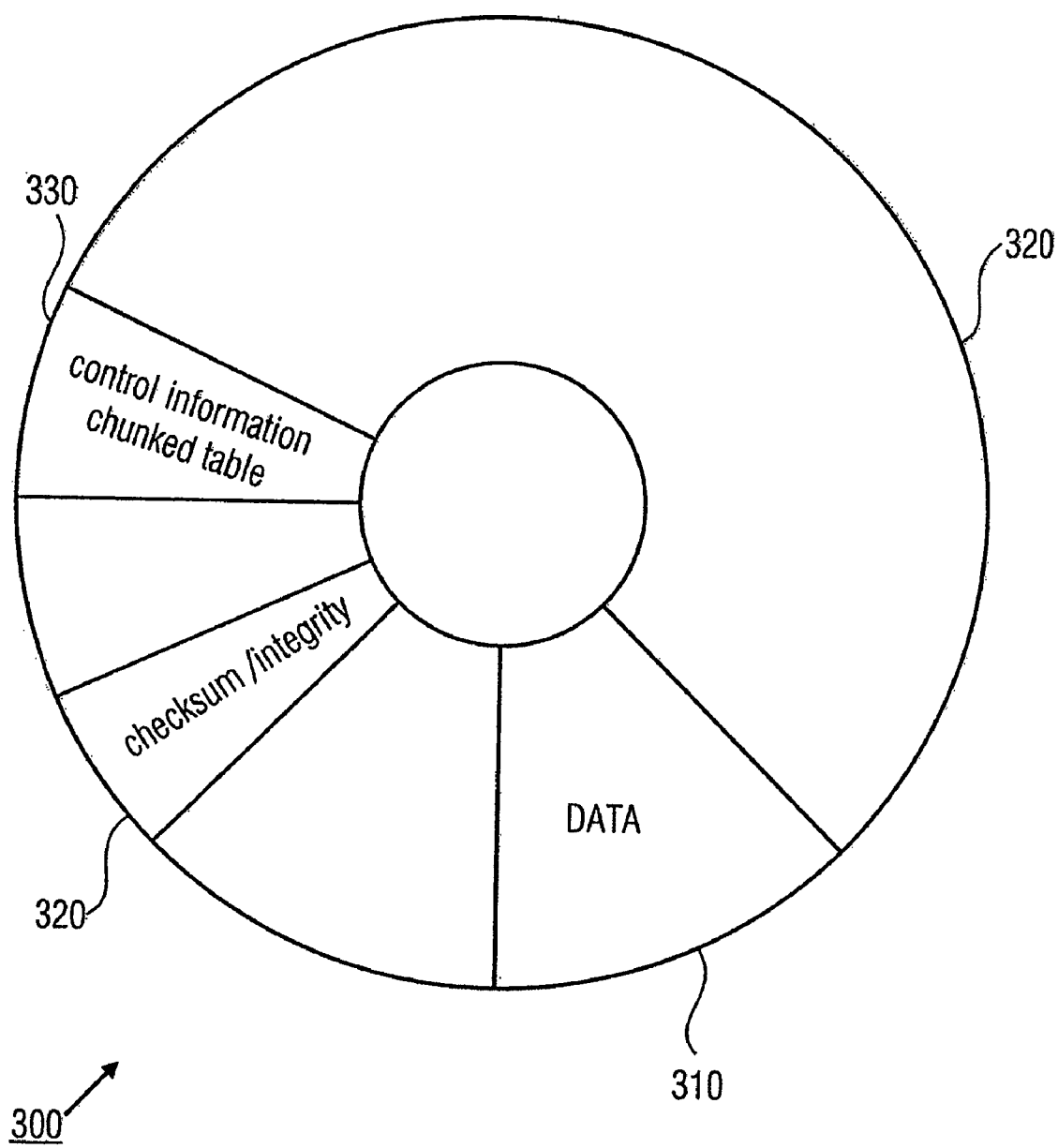
FIG. 3 shows an embodiment of a storage medium.

FIG. 3 shows an embodiment of a storage medium 300. The storage medium may be an optical disc comprising a data section 310 having data information. The storage medium or optical disc 300 further comprises a checksum section 320 having information on checksum data or encrypted checksum data based on the data information. Moreover, the optical disc or storage medium 300 comprises a control section 330 having information on the association of data information and information on checksum data or encrypted checksum data.

Within the control section 330, a chunk table may be provided indexing or pointing to, in one embodiment in terms of logical sector numbers, data blocks and associated checksum information. For a better overview FIG. 3 shows a logical structure of a storage medium, which could have a sequential physical structure as for example used for optical storage media written sequentially in one long track.

FIG. 4 shows a basic SecurDisc technology anchor structure (BTAS=Basic SecurDisc Technology Anchor Structure). The BTAS can e.g. be located in RLSN 15 (RLSN=Relative Logical Sector Number), relative to the beginning of a SecurDisc enabled recording session at offset RBP 64 (RBP=Relative Byte Position). Moreover, one redundant copy of BTAS can be located at either the last LSN of a SecurDisc enabled recording session, or the logical sector immediately preceding the secondary AVDP (AVDP=Anchor Volume Description Pointer). The BTAS references an FFIT (FFIT=File Fragment Information Table) and a redundancy information block, as well as a second redundancy backup copy of each of these structures, and thus serves as an anchor for all SecurDisc structures located in the user data area. FIG. 4 shows an embodiment of an exemplified BTAS.

FIG. 4 shows a field for the structure size which specifies the total size of the structure in bytes as a Big-Endian value, which can for example be 56-bytes. Moreover, FIG. 4 shows a structure identifier "BTAS", which contains an ASCII (ASCII=American Standard Code for Information Interchange) representation of "BTAS" identifying the structure as a SecurDisc technology anchor structure.

The field DSILSN (DSI=Disc Security Information) specifies the logical sector number of the disc security information structure as a Big-Endian value. If this security information is not present, all bytes of this field are set to zero. Furthermore, FIG. 4 shows the FFITLSN, which specifies the logical sector number of the FFIT as a 64-bit Big-Endian value.

Another field shown in FIG. 4 is the ARBLSN (ARB=Application Revocation Lock) and specifies the logical sector number of ARB as a 64-bit Big-Endian value, or a field filled with zeros, if no ARB is present. The ARB is necessary in the embodiments for all media that use copy protection or pass phrase protection features of SecurDisc. An ARB is a revocation block, which can be used to revoke compromised applications.

FIG. 4 further shows a "Backup DSILSN"-, a "Backup FFITLSN"- and a "Backup ARBLSN"-field, which specify the logical sector numbers of the respective backup structures. The FFIT contains information about each contiguous area of the disc that is managed by SecurDisc, such contiguous areas may include files that are copy protected or pass phrase protected, as well as files protected by checksums. The FFIT is stored after all other files on the disc, to allow checksums to be generated on-the-fly during the recording process. The location of the FFIT is flexible, the FFIT is referenced by the BTAS. It begins with a header and an embodiment of a structure is shown in FIG. 5.

Header information is comprised in the FFITH (FFITH=FFIT Header)-field containing version information and a field indicating the different SecurDisc features that are used on any part of the media. A backup of the FFIT is referenced by the BTAS as mentioned above. Its location may be freely selected. However, to achieve maximum reliability, the backup FFIT should be physically distant from the first copy of the FFIT, as a minimum requirement, the backup FFIT can be stored in a packet different to the primary FFIT.

As indicated in FIG. 5, the structure starts with the "FFITH Size"-field (FFITHS=FFITH size), which specifies the total size of the FFITH and bytes as a Big-Endian value. In one embodiment the structure size may be 40 bytes. Moreover, FIG. 5 shows the FFIT identifier, which contains a ASCII representation of the string "BFIT" identifying the structure as a SecurDisc file fragment information table.

Moreover, FIG. 5 shows a SecurDisc FFIT version number, which specifies a version number of the structure. The first byte contains a high version number the second byte contains a low version number. The high version number is 01h in one embodiment. An implementation may only rely on the layout of the remaining information of the FFITH and its FFITE (FFITE=FFIT Entry) if the high version number is 01h. If only the low version number is higher than the version number an implementation supports, the implementation may still rely on the structures that have been defined in a previous version of an embodiment.

Furthermore, FIG. 5 shows a "SecurDisc Copy Protection Recovery"-field, which comprises the 128-bit disc unique ID encrypted with a 128-bit AES key value derived from a special copy protection recovery pass phase calculated as described above. There may be no pass phrase verification checksum for this value in another embodiment. If no copy protection recovery pass phrase has been specified during the authoring process all bytes of this field may be set to zero.

Moreover, FIG. 5 shows a SecurDisc pass phrase verification checksum, which comprises an 128-bit checksum that can be used to verify the correctness of the pass phrase entered by a user. The pass phrase verification checksum has a fixed value PVC, which can be encrypted using the key contribution derived from the user pass phrase, as it was described above.

Furthermore, there is a SecurDisc global feature flag mask in FIG. 5 comprising the result of an XOR operation, combining all feature flag masks of all FFITE of this FFIT. FIG. 5 also shows an FFITE chunk size, which is a 32-bit Big-Endian value in this embodiment, and all FFITE may be stored as a chunked information list with a fixed chunk size. At the bottom of the structure shown in FIG. 5 there is a number of FFITE chunks, which specifies the number of FFITE chunks contained in the file fragment information table as a 64-bit Big-Endian value. The chunk list of FFITE starts immediately after the FFITH, as depicted in FIG. 5.

The FFITH may grow as additional fields are added in further embodiments. The location of the FFITE can be calculated as $$FFITEOFFSET[0]=FFITLSN*BPS+FFITHS$$

$$FFITELSN[0]=FFITEOFFSET[0] \text{ DIV } BPS$$

$$FFITERBP[0]=FFITEOFFSET[0] \text{ MOD } BPS$$

with FFITEOFFSET[0] being the relative bit position (RBP=Relative Bit Position) of the first FFITE relative to the beginning of the user data area of the disc, BPS is the number of bytes per sector and FFITELSN is the LSN of the FFIT.

The result of this operation is FFITELSN[0], the LSN of the first FFITE and FFITERBP[0], the relative byte position of the first FFITE from the beginning of the sector specified by the FFITELSN[0].

FFITE are stored in ascending order of their fragments' LSN. The location of a particular entry x is calculated as $$FFITEOFFSET[x]=FFITEOFFSET[0]+x*FFITECS$$

$$FFITELSN[x]=FFITEOFFSET[x] \text{ DIV } BPS$$

$$FFITERBP[x]=FFITEOFFSET[x] \text{ MOD } BPS,$$

where FFITEOFFSET[x] is the RBP of the x-th FFITE relative to the beginning of the user data area of the disc, x is a number between 0 and NUMFFITE−1 and FFITECS is the FFITE content size.

The result of this operation is FFITELSN[x], the LSN of the x-th FFITE and FITERBP[x], the relative byte of the x-th FFITE from the beginning of the sector specified by FFITELSN[x].

An embodiment of an FFITE structure is shown in FIG. 6. FIG. 6 shows an "LSN of File Fragment"-field, which specifies the LSN of the file fragment managed by the FFITE. Moreover, a field is dedicated to the size of the file fragment in logical sectors, specifying the size of the file fragment managed by the FFITE in logical sectors. A logical sector is the smallest logical unit for SecurDisc. If a sector is not used completely, the remaining space can be filled with zeros in this embodiment.

A pass phrase protected field "PP" comprises a flag, also being part of the SecurDisc feature flag mask. If true, the file fragment managed by this FFIT is pass phrase protected. The "CS"-field is also part of the SecurDisc feature flag mask. If true, the content of the file fragment managed by this FFITE can be verified using the "File Fragment Checksum"-field stored in this FFITE.

The "CP"-field is part of the SecurDisc feature flag mask. It can assume four distinct conditions regarding copy protection for the file fragment managed by this FFITE as specified in the Table in FIG. 7. FIG. 7 shows an embodiment of the copy protection values, indicating whether copy protection is used or not for this file fragment, and whether special protected output rules apply.

FIG. 6 further shows the file fragment checksum in case the CS flag is true, this field may contain a AES-128 cryptographic hash of the file fragment managed by this FFITE. If the CS flag is false, this field may contain all zeros. Moreover, FIG. 6 shows in row 6, a space that can be reserved for SecurDisc feature flag mask extensions.

FIG. 8 shows an embodiment of a disc security information structure (DSI=Disc Security Information). The disc security information structure stores global information about disc security. It is stored after all other files on the disc to allow digital signatures to be generated on-the-fly. The location of the DSI may be referenced by the BTAS as mentioned above. The DSI can be stored in a contiguous area of the disc.

Moreover, a backup DSI may be referenced by the BTAS in an embodiment. Its location may be freely selected. However, to achieve maximum reliability, the backup DSI should be physically distant from the first DSI copy. As a minimum requirement, the backup DSI should be stored in a different packet than the primary DSI in an embodiment.

If the backup DSI is located on a disc before the primary DSI, a "RSA Disc Signature"-field of the backup DSI may be assumed to have all its bits set to zero when calculating the digital signature in this embodiment (RSA=Initials of Surnames of Inventors, Rivest, Shamir and Adleman). Moreover, the DSI structure may store up to 65535 redundancy map references in embodiments. This allows for a very fine-grained configuration of redundancy mapping.

FIG. 8 shows an embodiment of a DSI structure. The "DSI Size"-field specifies the size of the structure in bytes, as a Big-Endian value. In this embodiment, the size is 120+(N+1)×1Ch. The DSI identifier can be a 4 byte identifier, identifying the structure as a DSI structure. This identifier may contain the ASCII representation of "BDSI".

In an embodiment a SecurDisc DSI version number specifies the version number of the structure. The first byte may contain the higher version number and the second byte may contain the lower version number in this embodiment. The higher version number may be 01h for this embodiment, the low version number may be 00h. An implementation may only rely on the layout of the remaining information of DSI if the higher version number is 01h. If only the low version number is higher than the version number the implementation supports, the implementation may still rely on the structures that have been defined in a previous version.

The number of redundancy maps N specifies the number of redundancy maps referenced by the structure as a 16-bit Big-Endian value. The minimum number of redundancy maps may be 1 in an embodiment, so the actual number of redundancy maps can be N+1. As mentioned above, in the "Reserved"-field, all bytes may be set to zero.

A "Disc Signature RSA Public Key Hash"-field may contain a 128-bit AES hash value of the public key that can be used for signature verification. It may be used by an implementation to check whether the correct public key has been supplied by the user to verify the authenticity of the disc. If the disc is not digitally signed, all bits of the field may be set to zero.

A "RSA Disc Signature"-field may contain a 256-bit RSASSAPSS digital signature (PSS=Probabilistic Signature Scheme). If the disc is not digitally signed, all bytes of this field are set to zero. An SHA-1 (SHA=Secure Hash Algorithm) hash value generated for the digital signature contains all data starting from the beginning of the session until the last byte before the "RSA Disc Signature"-field of the primary DSI. If the area covered by the SHA-1 hash includes the backup DSI structure, the structure can be included in the hash with its "RSA Disc Signature"-field set to all zeros.

The redundancy information contains information about redundancy maps on the SecurDisc media. It is used when data is stored redundantly to allow recovery from fatal read errors, and corresponds to control information, specifying location and presence of redundancy data, according to an embodiment.

A more detailed embodiment of a redundancy information structure is shown in FIG. 9. The structure shown in FIG. 9 may repeat N+1 times, so one entry can be present for each redundancy map defined in the DSI structure explained above. If the "Map Type"-field is set to false, the "Redundancy Level"-field specifies how many packets may form a redundancy group. The value may be in the range from 1 through $(2^{32}-1)$ with 1 being the highest security level. If the "Map Type"-field is set to true, the redundancy level may specify how many redundancy packets are written for a single user data packet. The value can be in the range from 1 to $(2^{32}-1)$ with $2^{32}-1$ being the highest security level. In one embodiment setting this field to zero may serve as switching off the enhanced data security feature.

The "Map Type"-field may specify the type of mapping between redundancy packets and user data packets, i.e. between data and redundancy data. If this bit is set to true, the mapping between user data packets and redundancy packets may be 1:N. This means that for a single user data packet, at least one redundancy packet exists. The exact number may be specified by a "Redundancy Level"-field. If the bit is set to false, the mapping between user data packets and redundancy packets may be N:1. This means that at least one user data packet may be mapped to a single redundancy packet. The exact number of user data packets mapped to a single redundancy packet may be specified by the "Redundancy Level"-field. In the "Reserved"-field, all bits are set to zero as mentioned above.

A "Redundancy Function"-field can specify the redundancy function used. In one embodiment, a value of 00h may indicate that enhanced data security is not used. For example, a value of 01h may indicate that an XOR redundancy grouping scheme is used. In this scheme, two data packets are processed using an XOR operation, of which a redundancy packet results. Any two of the then three packets allow to restore the two data packets. The "Redundancy Function"-field may specify other redundancy functions as, for example, the usage of Reed Solomon encoding, a convolutional coding scheme or even enable the usage of turbo codes.

A "Number of Redundancy Map Entries"-field may specify the number of redundancy map entries as a Big-Endian DWORD value. The "Redundancy Map LSN"-field specifies the LSN of the redundancy map as a Big-Endian 64-bit value or zero if the enhanced data security feature is not used. A "Backup Redundancy Map LSN"-field may specify the LSN of the backup redundancy map as a Big-Endian 64-bit value or zero, when the feature is not used.

The redundancy map information structure provides a 1:N or N:1 mapping between user data packets and redundancy packets. Which mapping mode is in use for a particular disc may be determined by the "Map Type"-field specified in the "Redundancy Information"-field of the DSI structure. If the "Map Type"-field is set to false, a unique packet corresponds to a redundancy packet and a mapped packet corresponds to a user data packet according to the structure depicted in FIG. 10. If the "Map Type"-field is set to true, a unique packet corresponds to a user data packet and a mapped packet corresponds to a redundancy packet in FIG. 10. Therewith, different code rates are enabled, which are literally 1:N, respectively N:1. The redundancy map comprises entries according to the structure depicted in FIG. 10. Redundancy map entries are sorted in ascending order of their unique packet number in this embodiment.

A backup of the redundancy map information is referenced by the DSI structure. Its location may be freely selected. However, to achieve maximum reliability, the backup redundancy map should by physically distant from the first copy. As a minimum requirement, the backup redundancy should be stored in a different packet than the primary in an embodiment.

In FIG. 10, a "Unique Packet Number"-field may specify a packet number of the unique packet with the meaning specified above. The packet number of a "Mapped Packet#N"-field may specify a REDLEVEL entry following the unique packet number. They specify the mapped packets with the meaning specified above.

FIG. 11 shows an embodiment of an application revocation block structure (ARB=Application Revocation Block). The primary and backup ARB are referenced by the BTAS. The allocation may be freely selected. However, to achieve maximum reliability, the backup ARB should be physically distant from the primary ARB copy. In one embodiment, the minimum requirement would be to store the backup ARB in a different packet than the primary ARB.

The application revocation block, as exemplified in FIG. 11, may serve as a key ingredient and has two fields. According to FIG. 11, the "ARB Length"-field specifies the length of the application revocation block in bytes as a Big-Endian WORD value. The "Application Revocation Block"-field specifies the application revocation block in the format of a revocation block, as described above.

Part of an embodiment of SecurDisc, can be that a SecurDisc feature descriptor allows the host to determine whether SecurDisc is supported by an optical disc drive and whether the optical disc currently in the drive can be used with SecurDisc. In an embodiment the feature will be set to active regardless of whether an optical disc has already been written to using SecurDisc or not. An optical disk drive (ODD=Optical Disk Drive) may support a GET CONFIGURATION command as specified by the MMC/MtFuji (MMC=Multimedia Command) specification and it may be used to obtain the feature descriptor from the ODD. The execution of this command may not be necessary prior drive host authentication.

An embodiment of a feature descriptor structure is depicted in FIG. 12. The structure in FIG. 12 shows a feature code, which could for example be 0113h (Big-Endian) for an embodiment of Securdisc. The "Current"-field comprises a flag indicating whether an optical disc can be used for Securdisc recording is in the drive. The "Persistent"-field comprises a flag indicating that the status of the current flag may change any time, in other embodiments it may be set to true. Moreover, the "Version"-field may be set to zero for a version of an embodiment. It is meant to change, only if any optical disc drive side changes may occur in the future. The "Reserved"-field is reserved and may contain only zeros in this embodiment. The "Additional Lengths"-field may be set to 4 to allow for future extensions. If the CPA (CPA=Copy Protection Active) is set to true, this flag specifies that the Securdisc copy protection feature can be used with the optical disc that is currently inserted in a drive.

After the Securdisc feature descriptor is read, the host may make sure that it is working with a licensed Securdisc drive. Reading the Securdisc feature descriptor can be mandatory for drive host authentication to work in some embodiments. During drive host authentication, in addition to making sure that both the host application and the optical disc drive are licensed components, a bus key can be established. This bus key is used later to exchange cryptographic data for copy protection. Drive host authentication may be necessary before writing any Securdisc content.

Embodiments of the present invention provide the advantage that data can be verified and their origin can be authenticated. Therewith, embodiments of the present invention provide an enhanced data security and reliability.

Depending on certain implementation requirements of the inventive methods, the inventive methods can be implemented in hardware or in software. The implementation can be performed using a digital storage medium, in particular, a disc, DVD or a CD having an electronically readable control signals stored thereon, which co-operate with a programmable computer system, such that the inventive methods are performed. Generally, the present invention is, therefore, a computer program product with a program code stored on a machine-readable carrier, the program code being operated for performing the inventive methods when the computer program product runs on a computer. In other words, the inventive methods are, therefore, a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for writing checksum information on a data content on a storage medium, comprising:
a provider for providing checksum information based on a data content; and a writer for writing the data content, the checksum information and control information on a physical or logical location of the checksum information on the storage medium, such that a baseline reader and an enhanced reader can read the data content, the enhanced reader can read and process the control information and the checksum information and the baseline reader ignores, skips or does not read the checksum information.

2. The apparatus of claim 1, further comprising an encryptor for encrypting the checksum information to obtain an integrity information, the encryption being based on an encryption key and wherein the writer is adapted for writing the integrity information and control information on a physical or logical location of the integrity information to the storage medium.

3. The apparatus of claim 1, wherein the writer is adapted for writing on an optical disc, the optical disc having a user data area being adapted for storing the data content, wherein the writer is adapted for writing the control information on the physical or logical location of the checksum information or integrity information into the user data area.

4. The apparatus of claim 1, wherein the data content comprises data files, wherein the provider for providing the checksum information is adapted for providing checksum information for all data files stored on the storage medium and wherein the writer is adapted for writing the checksum information or the integrity information to the logical end of the storage medium.

5. The apparatus of claim 1, wherein the writer is adapted for writing a feature descriptor on the storage medium, the feature descriptor indicating that checksum information was written to the storage medium.

6. The apparatus of claim 1, wherein the writer is adapted for writing a control information comprising a chunk table specifying an association between data content and checksum information or integrity information on the storage medium.

7. The apparatus of claim 1, wherein the writer is adapted for writing a 128-bit checksum for a data segment to the storage medium.

8. The apparatus of claim 1, which is implemented in an optical disc drive.

9. A method for writing checksum information on a data content on a storage medium, comprising:
   providing checksum information based on a data content; and
   writing the data content, the checksum information and control information on a physical or logical location of the checksum information on the storage medium such that a baseline reader and an enhanced reader can read the data content, the enhanced reader can read and process the control information and the checksum information, and the baseline reader ignores, skips or does not read the checksum information.

10. A non-transitory computer readable storage medium storing a computer program comprising a program code for performing, when the computer program runs on a computer, a method for writing checksum information on a data content on a storage medium, the method comprising:
   providing checksum information based on a data content; and
   writing the data content, the checksum information and control information on a physical or logical location of the checksum information on the storage medium such that a baseline reader and an enhanced reader can read the data content, the enhanced reader can read and process the control information and the checksum information, and the baseline reader ignores, skips or does not read the checksum information.

* * * * *